No. 690,872. Patented Jan. 7, 1902.
W. M. PECK.
VEHICLE TIRE.
(Application filed May 2, 1899.)

(No Model.) 3 Sheets—Sheet 1.

WITNESSES:
H. E. Chase,
M. D. Lewis.

INVENTOR
Wells M. Peck
BY
Hoy & Parsons
ATTORNEYS

No. 690,872. Patented Jan. 7, 1902.
W. M. PECK.
VEHICLE TIRE.
(Application filed May 2, 1899.)
(No Model.) 3 Sheets—Sheet 2.
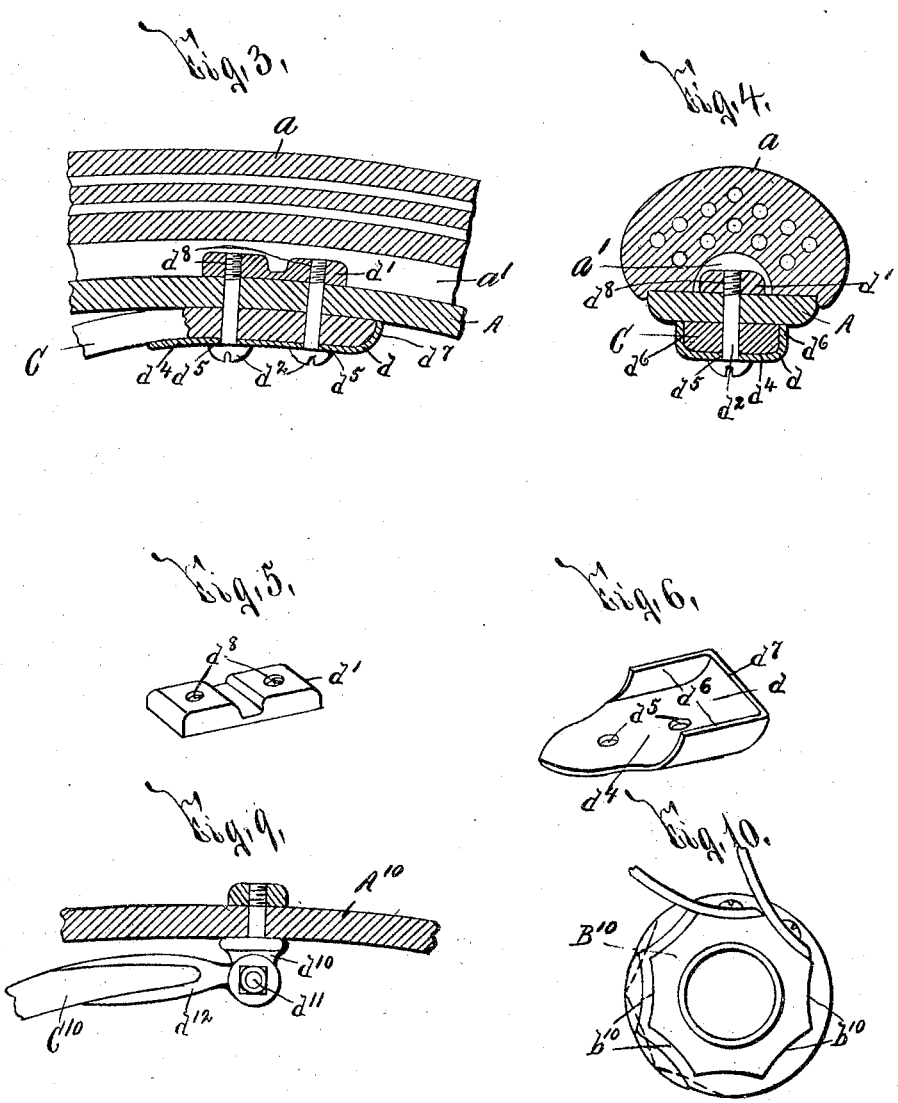

No. 690,872. Patented Jan. 7, 1902.
W. M. PECK.
VEHICLE TIRE.
(Application filed May 2, 1899.)
(No Model.) 3 Sheets—Sheet 3.
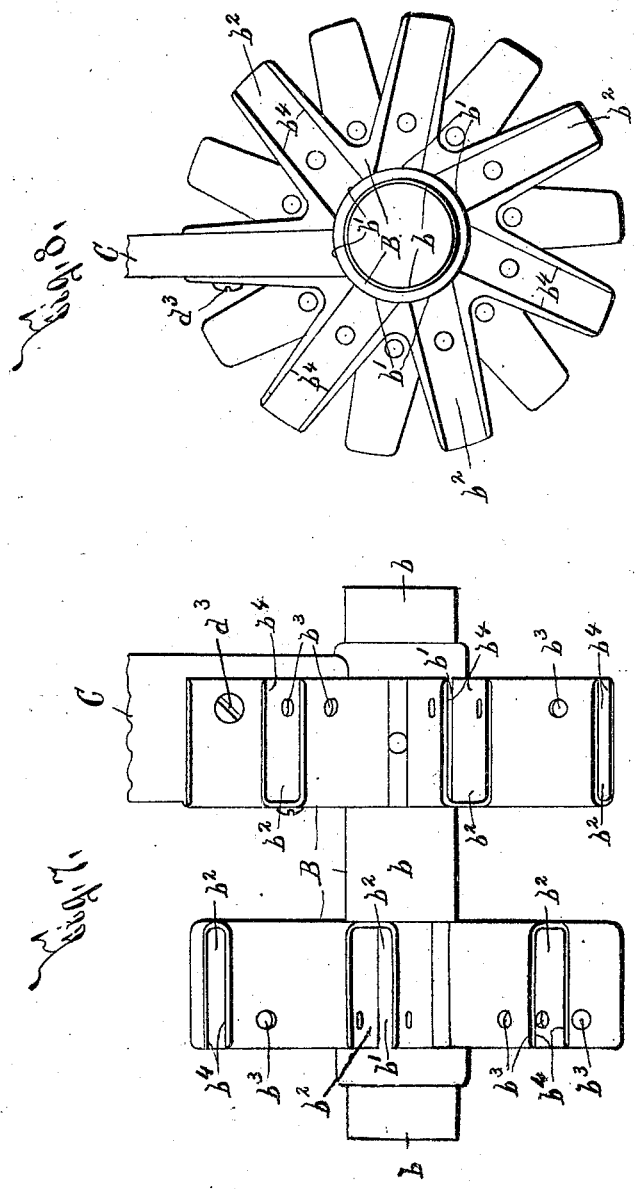
WITNESSES: INVENTOR

UNITED STATES PATENT OFFICE.

WELLS M. PECK, OF SYRACUSE, NEW YORK.

VEHICLE-TIRE.

SPECIFICATION forming part of Letters Patent No. 690,872, dated January 7, 1902.

Application filed May 2, 1899. Serial No. 715,305. (No model.)

*To all whom it may concern:*

Be it known that I, WELLS M. PECK, of Syracuse, in the county of Onondaga, in the State of New York, have invented certain new and useful Improvements in Vehicle-Wheels, of which the following, taken in connection with the accompanying drawings, is a full, clear, and exact description.

My invention relates to improvements in vehicle-wheels, and has for its object the production of a wheel which is economically manufactured, readily repaired, and is highly durable and effective in use; and to this end the invention consists in the combination, construction, and arrangement of the component parts of a vehicle-wheel, as hereinafter fully described, and pointed out in the claims.

In describing this invention reference is had to the accompanying drawings, forming part of this specification, in which like letters indicate corresponding parts in all the views.

Figure 1:
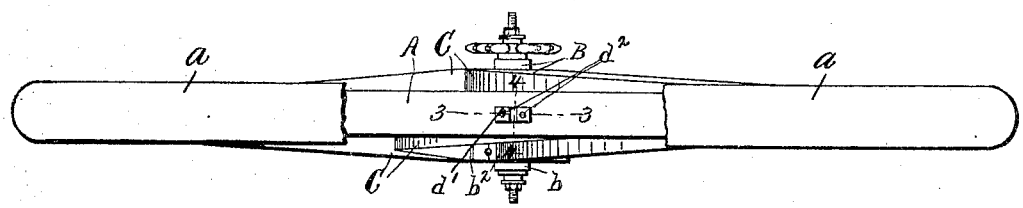
Figure 2:
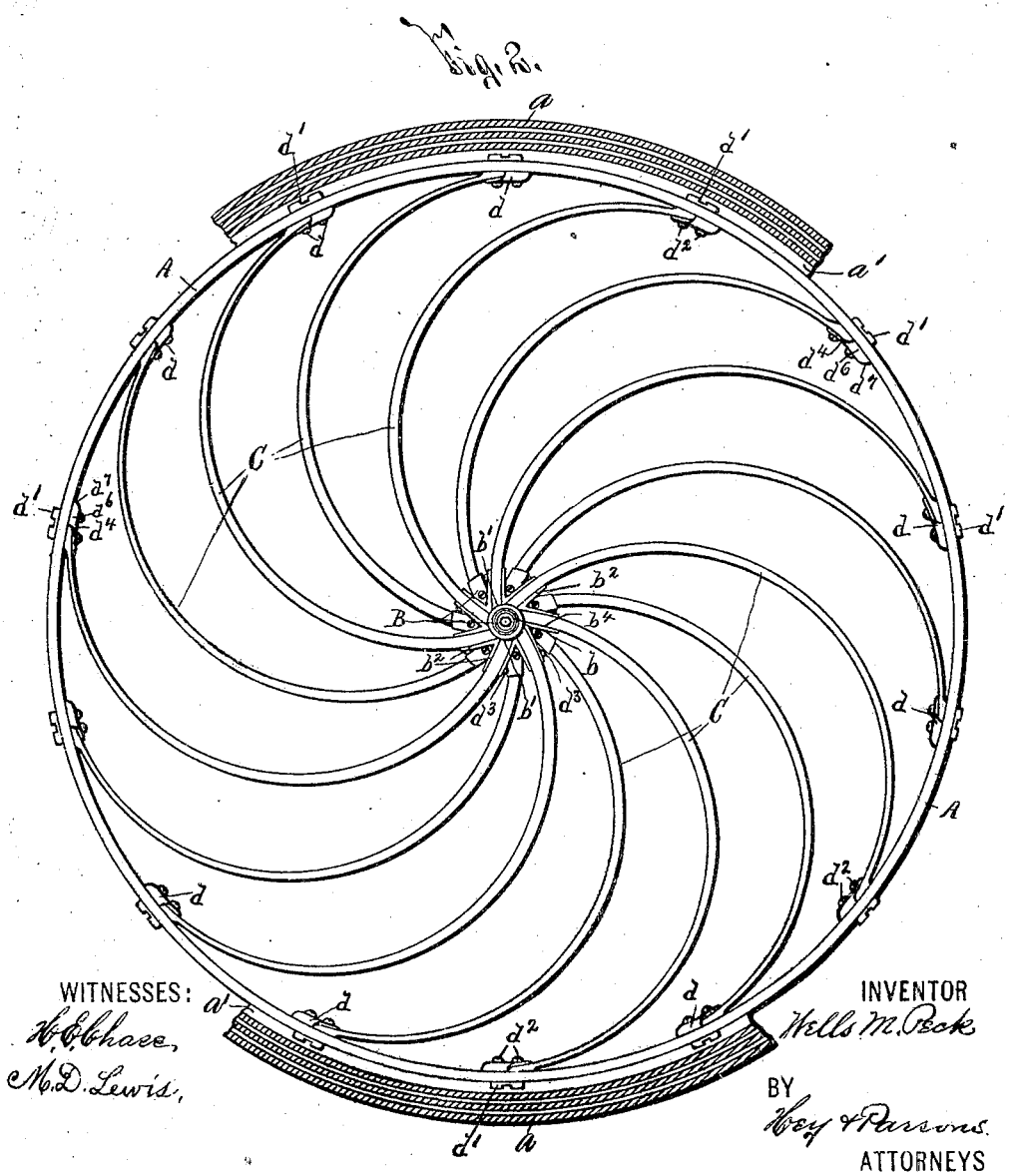

Figures 1 and 2 are respectively top plan and side elevation, partly broken away and in section, of my improved wheel. Figs. 3 and 4 are sectional views taken, respectively, on lines 3 3 and 4 4, Fig. 1, the tire being shown in position in both views. Figs. 5 and 6 are isometric views of the detached engaging member and securing-plate for securing the outer end of one of the spokes to the rim. Figs. 7 and 8 are respectively top plan and side elevation of the detached hub and the inner end of one of the spokes of my wheel. Fig. 9 is a sectional view, partly in elevation, of adjacent portions of the rim and spoke of a modified construction of my invention. Fig. 10 is a side elevation of a modified construction of hub for my wheel.

My improved vehicle-wheel consists of a rim A, a hub B, spokes C, and suitable means for securing the spokes in position.

The rim A is composed of any desirable flexible material, is of any suitable form, size, and construction, and is usually provided with a flexible tire $a$ of any desirable construction, having its inner face formed with an annular groove $a'$.

The hub B is of any suitable form, size, and construction and preferably consists of a hollow cylinder or barrel $b$, provided with peripheral bearing-faces $b'$ and sockets $b^2$, projecting outwardly from said bearing-faces. I generally provide said hub with two series of the faces $b'$, arranged side by side, with the bearing-faces of one series out of alinement with the bearing-faces of the other series, as best seen in Fig. 7. The front and rear walls of the sockets $b^2$ are usually provided with apertures $b^3$, and corresponding side walls of said sockets are formed with openings or slots $b^4$, which extend inwardly from the outer extremities of said sockets. The described construction of hub is particularly applicable for use with the remaining parts of my vehicle-wheel; but it is obvious that other forms of hubs, as the one $B^{10}$, (illustrated in Fig. 10,) may be used in said wheel without departing from the spirit of my invention. Said hub $B^{10}$ is provided with a plurality of concave bearing-faces $b^{10}$, arranged in substantially the same manner as the faces $b'$, and is unprovided with sockets projecting outwardly from said faces.

The spokes C are each preferably composed of a single piece of wood, formed substantially C-shaped and tapered in width and thickness from its inner end toward its outer end. The outer ends of the spokes C are secured at intervals to the rim A, and the inner ends of said spokes are movable into and out of the sockets $b^2$ through the openings or slots $b^4$ and are engaged with the bearing-faces $b'$.

The means for securing the spokes in position usually consist of engaging members $d$, securing-plates $d'$, and clamping-screws $d^2$ $d^3$. The engaging members $d$ are arranged at intervals upon the inner face of the rim A, are preferably formed with inner walls $d^4$, having apertures $d^5$ and slightly separated from the inner face of the rim A, and with side and end walls $d^6$ $d^7$, projecting from said inner walls toward the inner face of the rim A. Said engaging members $d$ are thus formed with sockets which are inclosed by the walls $d^6$ $d^7$ and extend substantially lengthwise of the rim and receive the outer ends of the spokes C. The securing-plates $d'$ are arranged at intervals upon the periphery of the rim A, within the groove $a'$ of the tire $a$ and in alinement with the engaging members $d$, and are formed with threaded apertures $d^8$. The clamping-screws $d^2$ are passed through the apertures $d^5$ $d^8$ in the engaging members $d$ and the securing-plates $d'$ and through additional apertures in the rim A and the outer ends of the spokes C and serve to firmly secure the outer ends of the spokes to the rim A. Said engaging members $d$, securing-plates $d'$, and clamping-screws $d^2$ form a particularly simple and effective means for securing the outer ends of the spokes to the rim A; but it is obvious that said outer ends of the spokes C may be otherwise secured to the rim A, as illustrated in Fig. 9, in which figure I have shown a rim $A^{10}$ as provided with an inwardly-projecting arm having an eye $d^{10}$ for receiving a pivotal pin $d^{11}$, passed through the outer end of a spoke $C^{10}$. The clamping-screws $d^3$ are passed through the apertures $b^3$ in the front and rear walls of the sockets $b^2$ and the inner ends of the spokes C and serve to firmly secure the inner ends of the spokes in position and permit their ready detachment when desired. When the hub $B^{10}$ is used with my improved wheel, the inner ends of the spokes of said wheel are suitably secured to the faces $b^{10}$, as seen in Fig. 10.

The construction and operation of my improved vehicle-wheel will now be readily understood upon reference to the foregoing description and the accompanying drawings.

Having thus fully described my invention, what I claim as new, and desire to secure by Letters Patent, is—

1. The combination with the hub of a vehicle-wheel; of a rim provided with sockets extending substantially lengthwise thereof, and spokes having their inner ends secured to the hub and their outer ends inserted into the sockets, substantially as and for the purpose set forth.

2. The combination with the hub of a vehicle-wheel; of a rim provided with sockets extending substantially lengthwise thereof, and substantially C-shaped spokes tapered in width and thickness from end to end, said spokes having their inner ends secured to the hub and their outer ends inserted into the sockets, substantially as and for the purpose specified.

3. The combination with the hub of a vehicle-wheel; of a rim, engaging members detachably secured to the rim and formed with sockets extending substantially lengthwise of the rim, and spokes having their inner ends secured to the hub and their outer ends inserted into said sockets, substantially as and for the purpose described.

4. The combination with the hub of a vehicle-wheel; of a rim, engaging members detachably secured to the rim, and each consisting of an inner wall arranged in proximity to the inner face of the rim, and side and end walls projecting from the inner wall toward the rim for forming a socket, and spokes having their inner ends secured to the hub and their outer ends engaged with the rim and the walls of said engaging members, substantially as and for the purpose set forth.

5. The combination with the hub of a vehicle-wheel; of a rim, engaging members detachably secured to the rim and formed with sockets extending substantially lengthwise of the rim, securing-plates engaged with the periphery of the rim and secured to the engaging members, and spokes having their inner ends secured to the hub and their outer ends inserted into said sockets, substantially as and for the purpose specified.

6. The combination with the hub of a vehicle-wheel; of a rim, engaging members each consisting of an inner wall arranged in proximity to the inner face of the rim, and side and end walls projecting from the inner wall toward the rim for forming a socket, spokes having their inner ends secured to the hub and their outer ends inserted into said sockets, securing-plates engaged with the periphery of the rim and formed with threaded apertures and clamping-screws passed through the rim and spokes and engaged with the engaging members and securing-plates, substantially as and for the purpose set forth.

7. The combination with the hub of a vehicle-wheel; of a rim, securing-plates arranged upon the periphery of the rim, spokes having their inner ends secured to the hub and their outer ends secured to said plates, and a tire encircling the rim and having its inner face formed with a groove for receiving the securing-plates, substantially as and for the purpose specified.

8. The combination with the hub of a vehicle-wheel provided with bearing-faces and sockets projecting outwardly from the bearing-faces, of a rim provided with sockets extending substantially lengthwise thereof, and spokes having their inner ends movable into and out of the sockets of the hub and their outer ends inserted into the sockets of the rim, substantially as and for the purpose described.

9. The combination with the hub of a vehicle-wheel provided with a plurality of series of peripheral bearing-faces, the bearing-faces of one series being arranged out of alinement with the bearing-faces of another series, a rim provided with sockets extending substantially lengthwise thereof, and spokes having their inner ends secured to said bearing-faces and their outer ends inserted into the sockets of the rim, substantially as and for the purpose specified.

10. The combination with the hub of a vehicle-wheel provided with a plurality of series of peripheral bearing-faces, the bearing-faces of one series being arranged out of alinement with the bearing-faces of another series, a rim, said hub being also provided with sockets projecting outwardly from the bearing-faces and formed with openings or slots extending through corresponding side walls thereof from their outer extremities, a rim provided with sockets extending substantially lengthwise thereof, and substantially C-shaped spokes having their inner ends movable into the sockets of the hub and their outer ends engaged with said bearing-faces inserted into the sockets of the rim, substantially as described.

5. In testimony whereof I have hereunto signed my name, in the presence of two attesting witnesses, at Syracuse, in the county of Onondaga, in the State of New York, this 11th day of October, 1898.

WELLS M. PECK.

Witnesses:
   E. A. WEISBURG,
   ARTHUR E. PARSONS.

It is hereby certified that in Letters Patent No. 690,872, granted January 7, 1902, upon the application of Wells M. Peck, of Syracuse, New York, in the grant and headings of the printed specification and drawings the title of the invention was erroneously written and printed "Vehicle-Tires," whereas the said title should have been written and printed *Vehicle-Wheels;* and that the said Letters Patent should be read with this correction therein that the same may conform to the record of the case in the Patent Office.

Signed, countersigned, and sealed this 25th day of March, A. D., 1902.

[SEAL.]

F. L. CAMPBELL,
*Assistant Secretary of the Interior.*

Countersigned:
F. I. ALLEN,
*Commissioner of Patents.*